United States Patent [19]

Sasaki

[11] Patent Number: 4,667,630
[45] Date of Patent: May 26, 1987

[54] FUEL EVAPORATION RATE CONTROL SYSTEM FOR A DIRECT FUEL INJECTION TYPE INTERNAL COMBUSTION ENGINE

[75] Inventor: Shizuo Sasaki, Susono, Japan

[73] Assignee: Toyota Jidosha Kabushiki Kaisha, Aichi, Japan

[21] Appl. No.: 803,712

[22] Filed: Dec. 2, 1985

[30] Foreign Application Priority Data

Dec. 7, 1984 [JP] Japan .................... 59-257653

[51] Int. Cl.⁴ .................................. F02F 3/22
[52] U.S. Cl. .......................... 123/254; 123/276; 123/41.35
[58] Field of Search ........... 123/41.35, 41.39, 196 AB, 123/254, 276

[56] References Cited

U.S. PATENT DOCUMENTS

| | | | |
|---|---|---|---|
| 3,195,520 | 7/1965 | Simko | 123/276 |
| 3,545,341 | 12/1970 | Fischer | 123/41.35 |
| 4,522,171 | 6/1985 | Dworak et al. | 123/254 |

FOREIGN PATENT DOCUMENTS

| | | | |
|---|---|---|---|
| 70020 | 4/1983 | Japan | 123/41.35 |
| 59-22907 | 2/1984 | Japan . | |
| 59-49719 | 4/1984 | Japan . | |

Primary Examiner—William A. Cuchlinski, Jr.
Attorney, Agent, or Firm—Kenyon & Kenyon

[57] ABSTRACT

In a direct fuel injection type spark-ignition internal combustion engine in which a fuel is injected from a fuel injection nozzle into a cylinder onto the surface of the combustion chamber wall and then the fuel adhering to the wall is evaporated so as to generate a combustible mixture gas, the temperature of the combustion chamber wall is controlled so as not to rise excessively in a high engine load range by controlling the flow rate of an oil jet sprayed onto the back surface of the combustion chamber wall in accordance with engine operating parameters. The temperature of the combustion chamber wall in a low engine load range is maintained comparatively high by constructing the wall from a heat insulating structure. Through this control, the maximum combustion pressure at high engine loads can be held small and the cycle-by-cycle variation in rate of combustion at low engine loads can be kept small.

13 Claims, 12 Drawing Figures (a)

(b)

FUEL EVAPORATION RATE CONTROL SYSTEM FOR A DIRECT FUEL INJECTION TYPE INTERNAL COMBUSTION ENGINE

BACKGROUND OF THE INVENTION

1. Field of the Invention:

The present invention relates to a fuel evaporation rate control system for a direct fuel injection type spark-ignition internal combustion engine.

2. Description of the Related Art:

An extremely high fuel efficiency can be attained by a direct fuel injection type spark-ignition internal combustion engine in which a fuel is directly injected into the cylinder onto the surface of the wall of a combustion chamber formed at the piston top and then the fuel having adhered to the wall is evaporated through heating the wall thereby generating a combustible gas. However, the direct fuel injection type internal combustion engine has drawbacks as mentioned below.

In the direct fuel injection type combustion engine, when engine speeds and engine loads are widely varied, the temperature of the combustion chamber wall to which the fuel adheres also varies widely. As a result, the fuel evaporation rate becomes too high in a range of high engine loads in which the temperature of the combustion chamber wall rises, resulting in an increase in combustion noise, due to too rapid combustion, and requiring increased engine weight to withstand the higher combustion pressure. Also, in a range of low engine loads and low engine speeds, the temperature of the combustion chamber wall drops too low, resulting in delayed combustion and increased volumes of HC and aldehydes in the exhaust gas.

It is known to spray a cooling oil jet onto the back surface of the combustion chamber wall in a diesel engine. Devices for controlling the volume of an oil jet sprayed onto the back surface of a piston are disclosed in Japanese Utility Model Publication SHO No. 59-22097 and Japanese Utility Model Publication SHO No. 59-49719. However, these prior publications disclose no more than devices for controlling the temperature of the piston of a diesel engine to prevent either excessive cooling or knocking. They have no concern with a spark-ignition type engine.

SUMMARY OF THE INVENTION

An object of the present invention is to suppress an excessive rise in temperature of a combustion chamber wall of a direct fuel injection type spark-ignition internal combustion engine in a range of high engine loads, thereby reducing the evaporation rate of fuel adhering to the surface of the combustion chamber wall, reducing the maximum combustion pressure and noise by prolonging the combustion period, and permitting reduced engine weight the maximum combustion pressure.

Another object of the present invention is to maintain the temperature of the combustion chamber wall over a certain level in a range of low engine loads and low engine speeds, thereby maintaining the fuel evaporation rate above a certain level, preventing delayed combustion, and suppressing HC and aldehydes volumes in the exhaust gas.

To accomplish these objects, a fuel evaporation rate control system for a direct fuel injection type spark-ignition internal combustion engine is provided according to the present invention, in which a fuel is injected into a cylinder onto a surface of a hot wall of a combustion chamber formed in the top of a piston, and then the fuel adhering to the wall is evaporated by heat from the wall to generate a combustible mixture gas. The system comprises a nozzle means for spraying a cooling oil jet onto a back surface of the combustion chamber wall; a valve means for adjusting an oil flow area of an oil path to the nozzle means; a computer means for calculating an optimum oil flow area of the oil path to obtain an optimum combustion chamber wall temperature corresponding to engine operating parameters based on a map and for sending its output to the valve means, thereby adjusting the oil flow area of the oil path to the calculated optimum oil flow area; and a sensor means for sensing the engine operating parameter and sending the signal of the engine operating parameter to the computer means as an input.

The flow rate of the oil jet is adjusted by the fuel evaporation rate control system to be large in a range of high engine loads, so that an excessive rise in the temperature of the combustion chamber wall is suppressed and the rate of fuel evaporation is lowered, thereby reducing combustion noise by prolonging the combustion period and also permitting reduction of the engine weight through reduction of the combustion pressure.

The combustion chamber wall may be constructed as a portion separate from a piston body, and the wall may be connected to the piston body at the periphery of the wall, the periphery having a small area of heat transfer as compared with an area of the back surface onto which the cooling oil jet is sprayed. The combustion chamber wall may be constructed of a heat insulating material. Due to the heat insulating structure of the combustion chamber wall, in a range of low engine loads in which the oil spraying is suppressed, the temperature of the combustion chamber wall can be maintained above a certain level, and the evaporation of the fuel adhering to the wall can be maintained at a comparatively high level, thereby reducing cycle-by-cycle variation rate of combustion and suppressing HC and aldehydes in the exhaust gas.

BRIEF DESCRIPTION OF THE DRAWING

The above objects, features and advantages of the present invention will be become apparent and more readily appreciated from the following detailed descriptions of exemplary embodiments of the present invention taken in conjunction with the accompanying drawings, wherein.

DETAILED DESCRIPTION OF THE PREFERRED EMBODIMENTS

Figure 1:
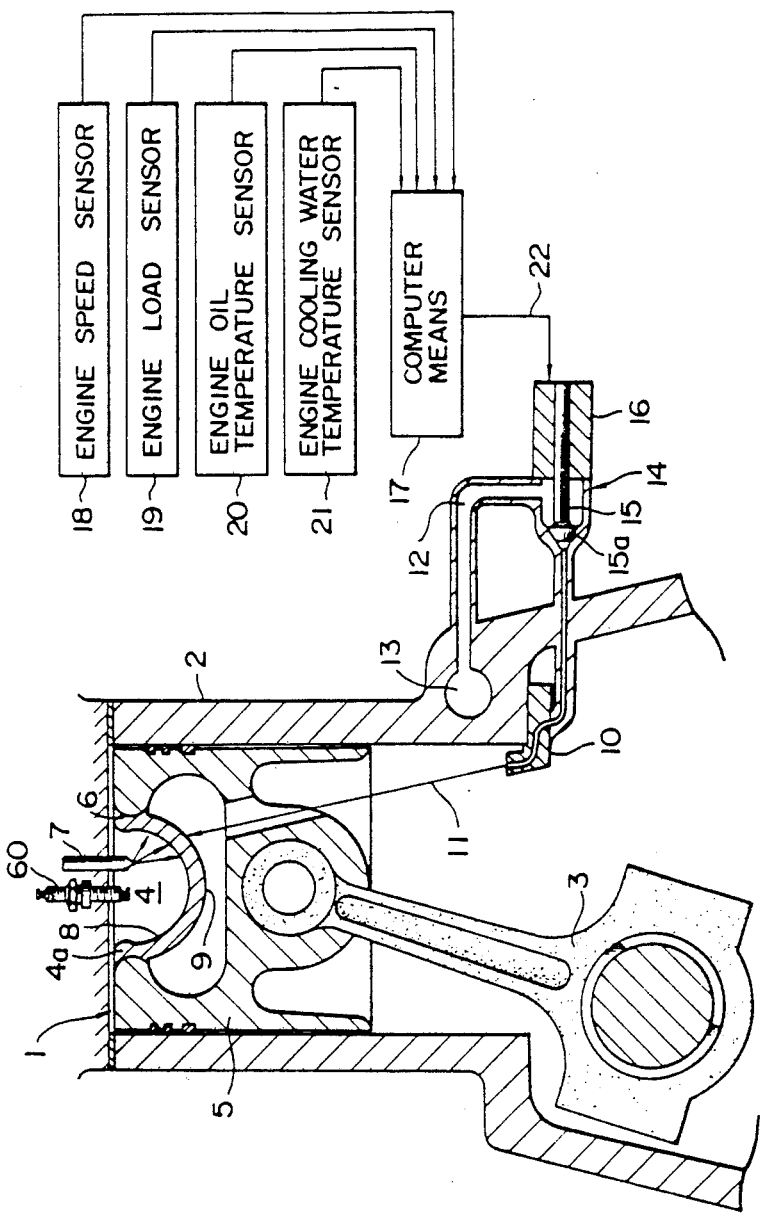
FIG. 1 is a sectional view of a fuel evaporation rate control system for a direct fuel injection type spark-ignition internal combustion engine according to a first embodiment of the present invention.

In FIG. 1, which shows a fuel evaporation rate control system for a direct injection type spark-ignition internal combustion engine according to a first embodiment of the present invention, a piston 1 is reciprocally positioned in a cylinder 2, and a connecting rod 3 is connected to the piston 1.

A combustion chamber 4 comprises a space within a concavity formed in the top of the piston 1. The combustion chamber 4 is defined by a combustion chamber wall 4a which forms a portion separate from a piston body 5. The combustion chamber wall 4a has a heat insulating structure such that heat is unlikely to transfer from the wall 4a to the piston body 5. In this first embodiment of the present invention the combustion chamber wall 4a is connected to the piston body 5 at the periphery 6 of the wall 4a, and the periphery 6 has a small area of heat transfer as compared with the area of the back surface 9 of the wall 4a. A fuel injection nozzle 7 is provided in the combustion chamber 4, and it injects fuel into the combustion chamber 4 onto a front surface 8 of the wall 4a. The fuel adhering to the surface 8 of the wall 4 is evaporated by heat from the surface 8, and as a result a combustible mixture gas is generated. The mixture is ignited by a spark plug 60.

Onto the back surface 9 of the wall 4a an oil jet 11 is sprayed from a nozzle means, such as an oil nozzle 10 which is provided below the piston 1. The oil nozzle 10 communicates via an oil path 12 to a main oil supply channel 13 formed in a cylinder block 3. The oil path 12 is provided with a valve means for adjusting the oil flow area of the oil path 12, so that the flow of oil which is supplied to the oil nozzle 10 is controlled by the valve means, which is a solenoid valve 14 in the first embodiment of the present invention. The solenoid valve 14 comprises a needle 15 which varies the oil flow sectional area of the oil path 12 and a solenoid 16 which operates the needle 15. The oil flow rate to the oil nozzle 10 can be adjusted by controlling the operation of the needle 15. The solenoid valve 14 is electrically connected to a computer means 17 for controlling the flow rate of the oil supplied to the nozzle means 11 by adjusting the valve 14. The computer means 17 receives input signals of two engine operating parameters, that is, engine speeds and engine loads from an engine speed sensor 18 and an engine load sensor 19 respectively. Since the engine loads are proportional to the fuel jet volume which is injected into the combustion chamber 4, the engine load sensor 19 may be a fuel flow volume sensor. The computer means also receives input signals of engine oil temperature from an oil temperature sensor 20 and engine cooling water temperature from a cooling water temperature sensor 21. These temperature signals indicate the engine warm-up conditions. Receiving the input signals of engine speeds and engine loads, the computer 17 calculates an optimum oil flow area of the oil path 12 based on a stored map, and the output signal from this calculation is sent to the solenoid valve 14.

Figure 2:
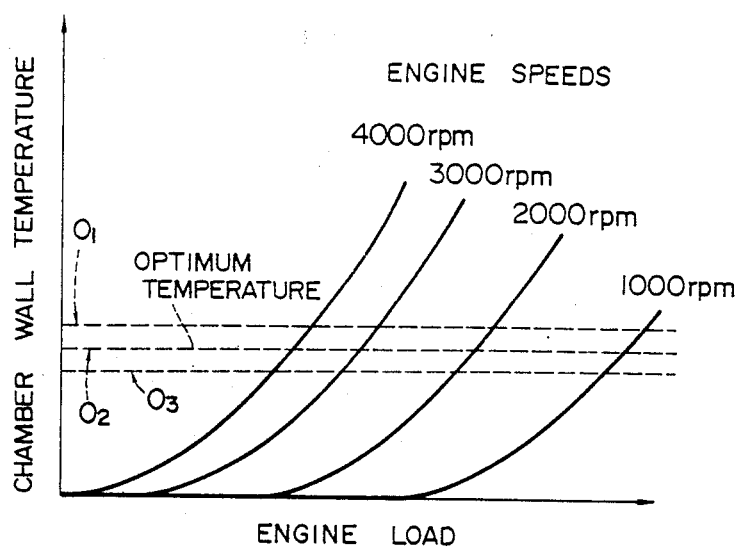
FIG. 2 is a diagram showing relationships between engine load and temperatures of a combustion chamber wall in a direct fuel injection type spark-ignition engine with the parameter of engine speeds varied.
Figure 3:
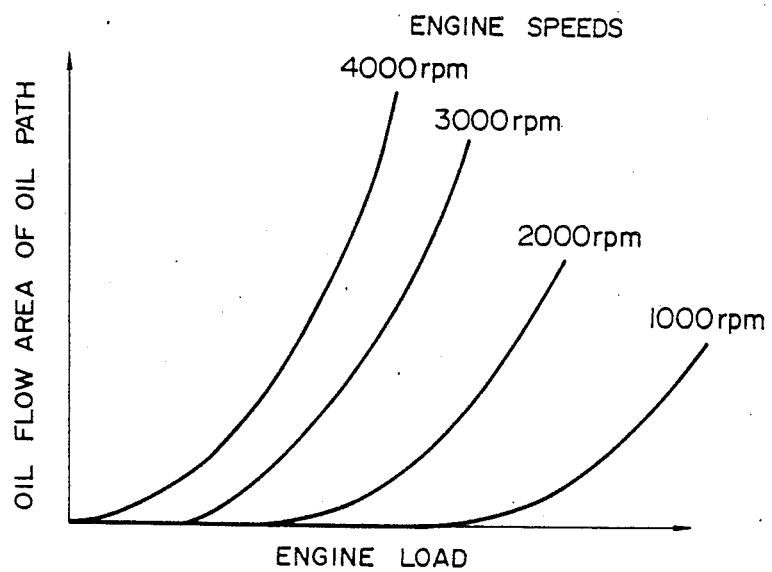
FIG. 3 is a diagram of a map stored in a memory of a computer showing relationships between engine load and flow area of a cooling oil path needed to maintain the temperature of the combustion chamber wall optimum in a direct fuel injection type spark-ignition engine with the parameter of engine speeds varied.

As data for determining the optimum values of the oil flow area of the oil path 12 and the oil jet flow rate, relationships shown in FIGS. 2 and 3 are used. FIG. 2 shows a relationship between engine load and the temperature of the combustion chamber wall 4a with the engine operating parameter of engine speeds varied in the case where the volume of the oil jet 11 is kept constant in a direct fuel injection type internal combustion engine. In FIG. 2, for a high engine load range there is an upper limit line $O_1$ of the combustion chamber wall temperature which is determined from the viewpoint of keeping the maximum combustion pressure Pmax below a certain level in order to suppress the combustion noises and to allow the engine weight to be reduced. Also shown in FIG. 2, for a low engine load range there is a lower limit line $O_2$ of the combustion chamber wall temperature which is determined from the viewpoint of maintaining the cycle-by-cycle variation in rate of combustion within a certain limit in order to shorten the combustion period, thereby improving the fuel efficiency and suppressing HC and aldehyde volumes in the exhaust gas. The distance between the lines $O_1$ and $O_2$ is an appropriate range of the combustion chamber wall temperature, and the line $O_3$ which is midway between the lines $O_1$ and $O_2$ denotes the optimum value of the temperature of the combustion chamber wall 4.

FIG. 3 shows a diagram corresponding to a map stored in the memory of the computer means. The map includes relationships between engine load and oil flow area of the oil path 12, that is, the oil flow area at a seat 15a of the needle 15 in the oil path 12, with the engine operating parameter of engine speeds varied so that the optimum combustion chamber wall temperature determined in FIG.2 may be obtained. Therefore, the map of FIG. 3 gives the optimum oil flow area of the oil path 12 corresponding to the inputs of engine speeds and engine loads.

Figure 4:
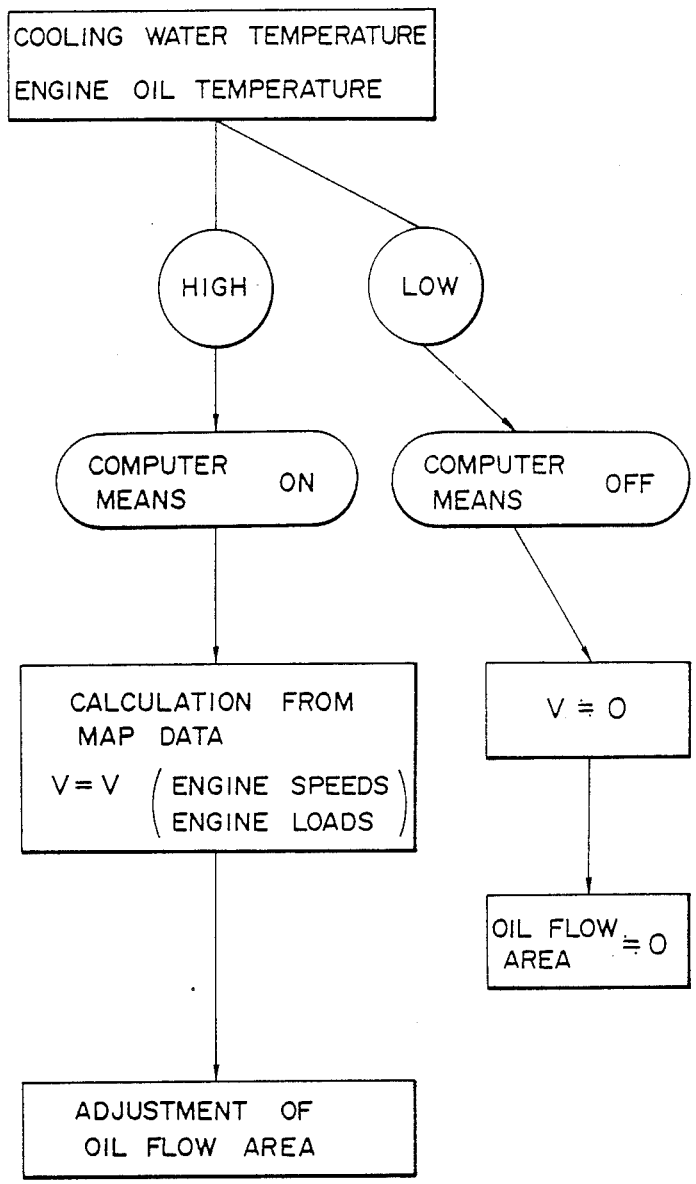
FIG. 4 is a flow chart for a computer of a fuel evaporation control system according to the first embodiment of the present invention.

FIG. 4 shows a flow chart of the control in the first embodiment of the present invention. As shown in the flow chart, when the engine cooling water temperature and/or the engine oil temperature are low, that is, when the engine is not enough warmed-up after engine start, the computer means 17 is set to OFF, and the oil flow area V of the oil path 12 is set nearly at zero. When the water temperature and/or the oil temperature rise above a certain level, that is, the engine is enough warmed-up, the computer means 17 is set to ON, and the calculation by the computer means is started. The optimum value of the oil flow area V of the oil path 12 is calculated based on the map corresponding to the engine speed signals sent from the engine speed sensor 18 and the engine load signals from either the engine load sensor 19 or the fuel injection volume signals in the computer means. The output of the optimum oil flow area of the oil path 12 is sent to the valve means 14 as an electric voltage signal.

Figure 5:
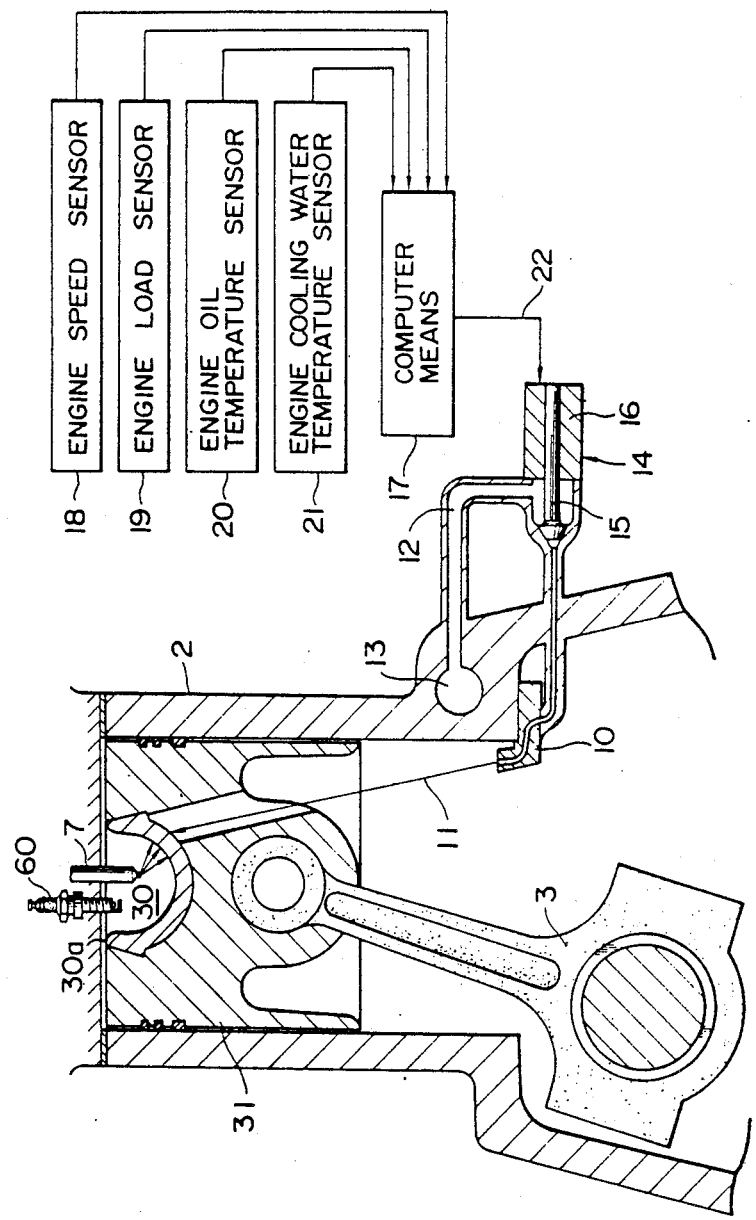
FIG. 5 is a sectional view of a fuel evaporation rate control system for a direct fuel injection type spark-ignition internal combustion engine according to a second embodiment of the present invention.

FIG. 5 shows a second embodiment of the present invention. In this embodiment, the heat insulating structure of the combustion chamber wall is achieved by making a combustion chamber wall 30a defining a combustion chamber 30 of a heat insulating material. Since the combustion chamber wall 30a can be held at a comparatively high temperature due to its heat insulating characteristic, the combustion chamber wall 30a may be joined to a piston body 31 with a large area of contact. The oil jet 11 is sprayed onto the back surface of the combustion chamber wall 30a. Other structures are the same as were described in the first embodiment, and the descriptions about them will be omitted by employing the same reference numerals for the same elements in FIG. 5 as in FIG. 1.

Figure 6:
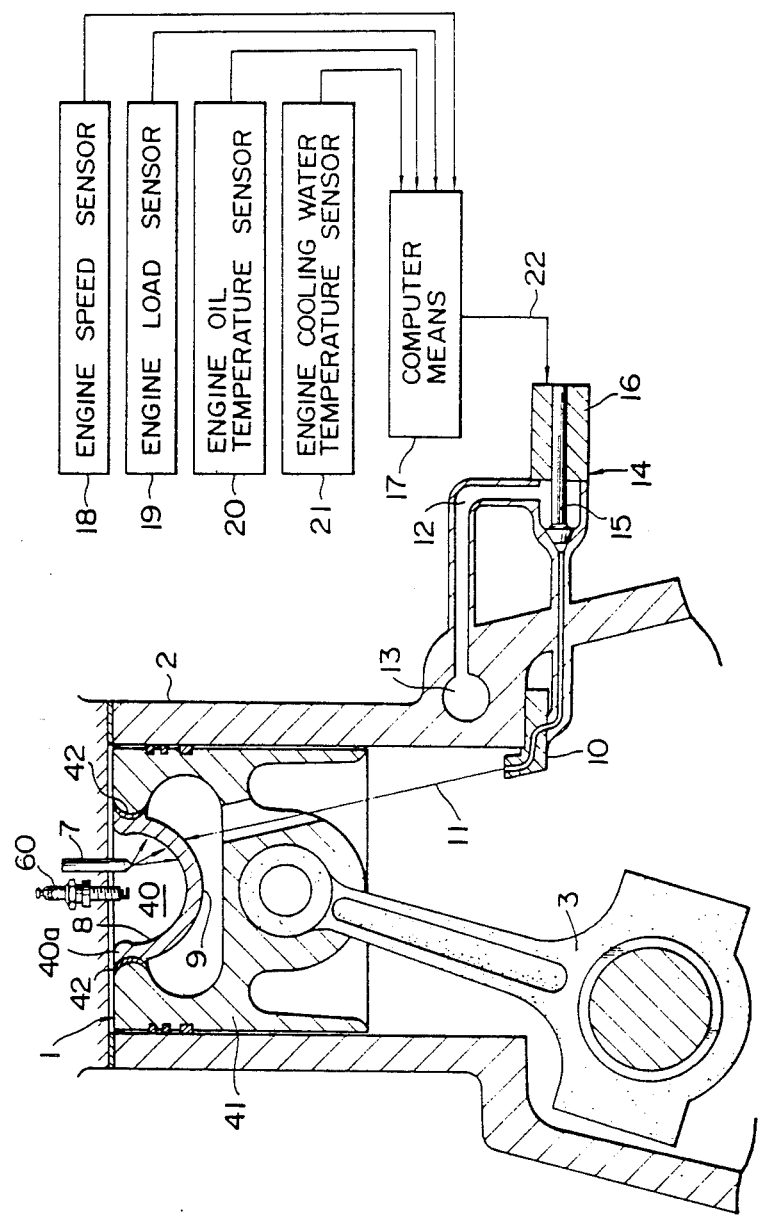
FIG. 6 is a sectional view of a fuel evaporation rate control system for a direct fuel injection type spark-ignition internal combustion engine according to a third embodiment of the present invention.

FIG. 6 shows a third embodiment of the present invention. In this embodiment, a junction 42 between a combustion chamber wall 40a defining a combustion chamber 40 and a piston body 41 is made of a heat insulating material. Other structures are the same as were described in the first embodiment, and the descriptions about them will be omitted by employing the same reference numerals to the same elements in FIG. 6 as in FIG. 1.

Figure 7:
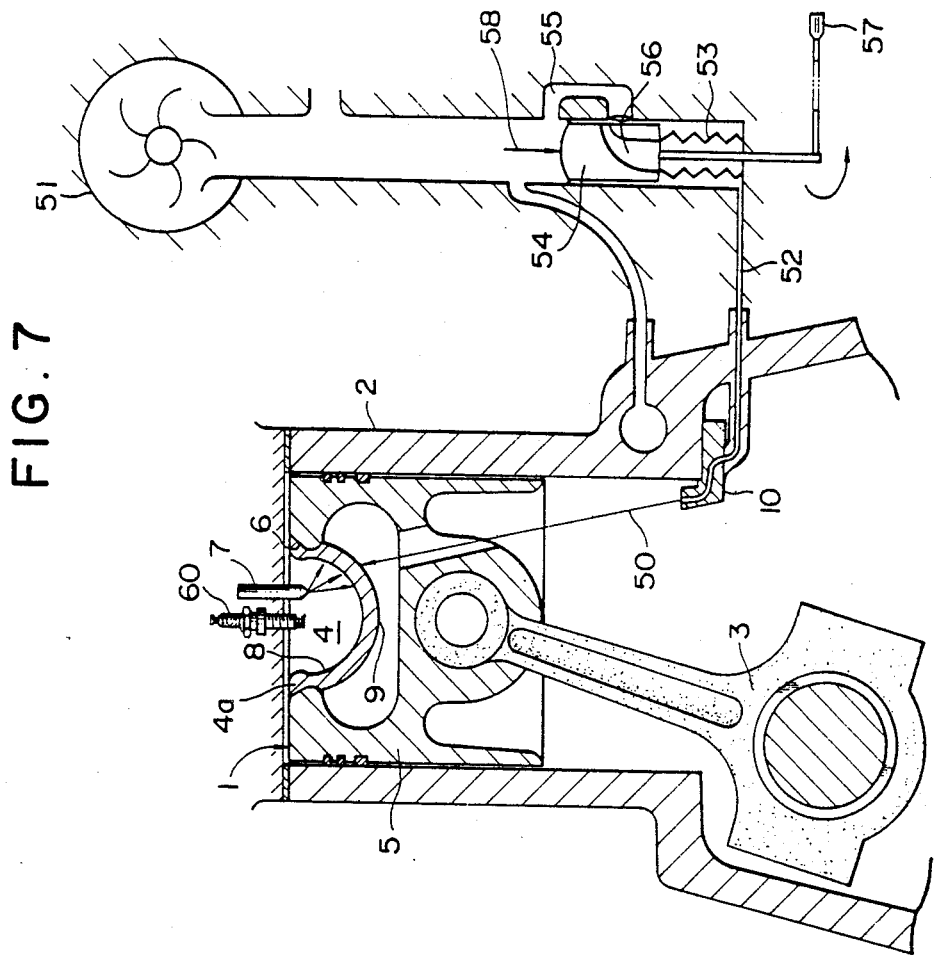
FIG. 7 is a sectional view of a fuel evaporation rate control system for a direct fuel injection type spark-ignition internal combustion engine according to a fourth embodiment of the present invention.

FIG. 7 shows a fourth embodiment of the present invention. In the embodiment, a piston 1, a cylinder block 2, a connecting rod 3, a combustion chamber 4, a combustion chamber wall 4a, a piston body 5, a junction 6, a fuel injection nozzle 7, a front surface 8 of the combustion chamber wall 4a, a back surface 9 of the combustion chamber wall 4a, an oil nozzle 10, and a spark plug 60 are the same as those in the first embodiment of the invention, and the same reference numerals as those in FIG. 1 are employed in FIG. 7. The combustion chamber wall 4a may be constructed of a heat insulating material, or the junction between the wall 4a and the piston body 5 may be constructed of a heat insulating material.

However, in the fourth embodiment, no computer means is employed for controlling the volume of the cooling oil jet. Instead, a control device for controlling the volume of an oil jet 50 is provided in an oil path 52 which leads the oil from an oil pump 51 to the oil nozzle 10. The oil path 52 is equipped with a plunger 54 therein which is urged upstream by a spring 53. The plunger 54 is slidable in the axial direction and rotatable around its axis. A bypass passage 55 connects an opening in oil path 52 upstream of the plunger 54 to an opening in path 52 at a midpoint of the plunger 54. The plunger 54 has an oil groove 56 on its surface serving as one portion of the oil path 52, and the oil groove 56 connects the midpoint of the plunger 54 to the oil path 52 downstream of the plunger 54. The sectional flow area of the oil groove 56 varies along the path, and therefore the common flow area with the bypass 55 varies when the plunger 54 is rotated around its axis. The plunger 54 is coupled via an appropriate means to an accelerator 57 so as to rotate with the movement of the accelerator.

The oil delivered from the oil pump 51 pushes the plunger 54 downstream with a pressure (indicated by arrow 58) which rises with increasing engine speeds. The plunger 54 moves to a position where the pressure 58 and the force exerted by the spring 53 are balanced. This movement of the plunger 54 changes the positional relationship between the bypass 55 and the oil groove 56. As a result, the common oil flow area of the oil groove 56 with bypass 55 varies, and the flow rate of oil jet 50 changes correspondingly. The flow rate of the oil jet 50 in the case where the volume of injected fuel is zero is determined based on the oil jet flow rate at engine speeds when the forces on the plunger 54 are balanced.

The plunger 54 rotates in proportion to the movement of the accelerator 57, that is, to the opening degree of the throttle valve, thereby changing the inlet area of the oil groove 56 adjoining the outlet of the bypass 55. As a result, the flow rate of the oil jet 50 from the oil nozzle 10 is adjusted to the optimum value corresponding to the engine speeds and the engine loads for proper cooling of the combustion chamber 4.

Next, the operation of the fuel evaporation control system for a direct injection spark-ignition internal combustion engine of the first to the third embodiments of the present invention will be described.

At first, the signals from the engine cooling water temperature sensor 20 and/or the engine oil temperature sensor 21 permit the engine warming-up state to be judged. When the engine is not warmed-up enough, that is, when the engine loads are low, the computer means 17 is set to OFF and the oil flow area of the oil path is reduced to nearly zero by the valve means 14. With a small oil jet flow rate, due to the small heat transfer area of the wall or to the heat insulating structure of the wall, the temperature of the combustion chamber wall 4a, 30a or 40a can be maintained comparatively high. Therefore, the cycle-by-cycle variation in rate of combustion in the low engine load range is maintained low, and combustion delay is prevented, thereby improving the fuel efficiency and reducing the volumes of HC, aldehydes and smoke in the exhaust gas.

When the engine is warmed-up enough, that is, when the engine loads are high, the computer means is set to ON. By calculating the optimum oil flow area of the oil path 12 by the computer means 17 and adjusting the oil flow area of the oil path 12 to the calculated optimum oil flow area by the valve means 14 corresponding to the engine operating parameters of engine speeds and engine loads, the temperature of the combustion chamber wall 4a, 30a or 40a can be controlled to be optimum from the viewpoint of preventing an excessive rise in the combustion chamber wall temperature. By keeping the temperature of the combustion chamber wall below a certain level, the maximum combustion pressure Pmax is also maintained below a certain level. As a result, the combustion noises are reduced and the engine weight also can be reduced by making the walls of the engine thin.

Figure 8:
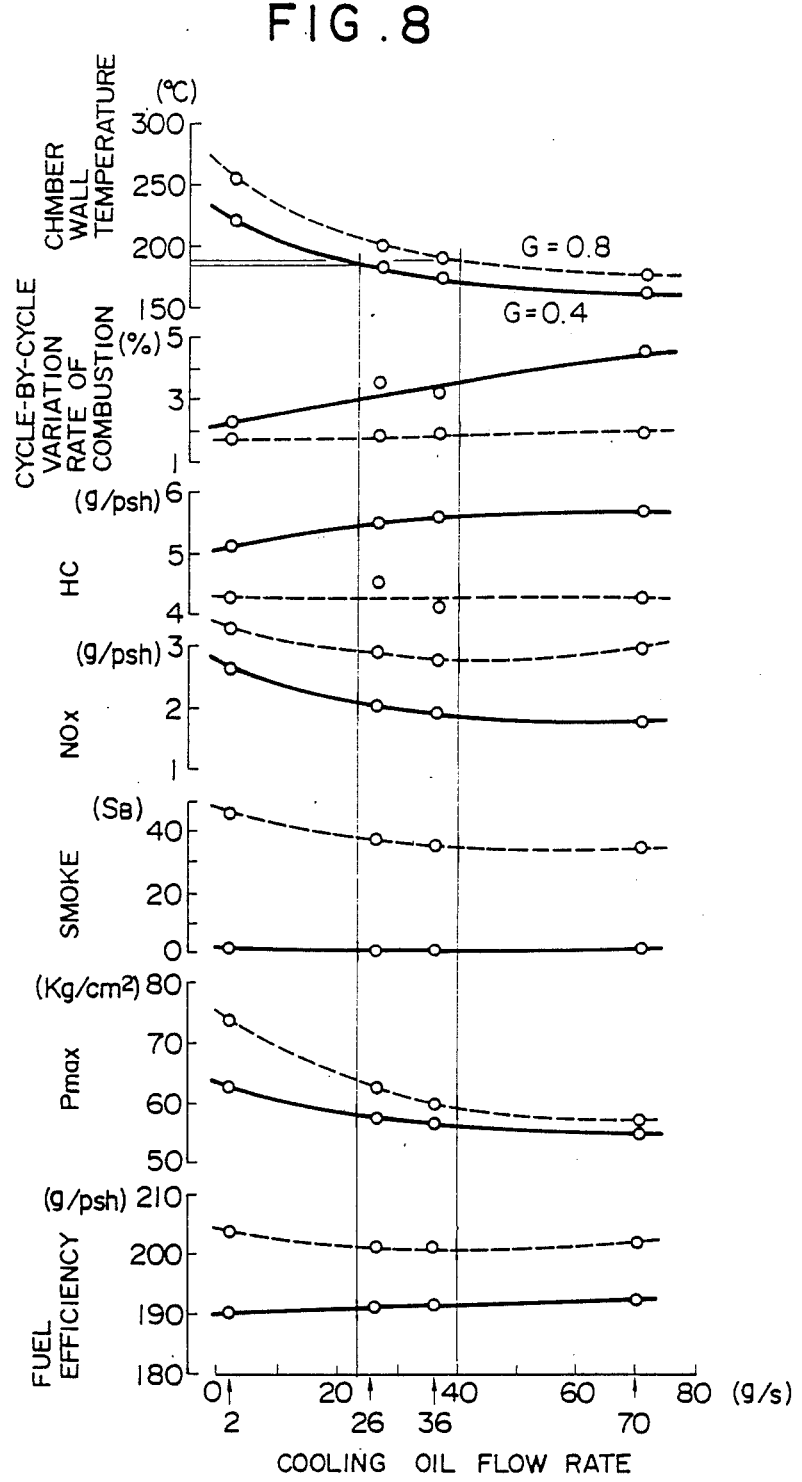
FIG. 8 is a diagram of the results achieved by the present invention showing relationships between flow rate of an oil jet and temperature of the combustion chamber wall, cycle-by-cycle variation in rate of combustion, HC volume in the exhaust gas, NOx volume in the exhaust gas, smoke volume in the exhaust gas, maximum combustion pressure Pmax, and fuel efficiency in the cases of a high engine load (G=0.8) and a low engine load (G=0.4)

FIG. 8 shows results of tests executed using the fuel evaporation control system for a direct fuel injection spark-ignition type engine of the present invention. The tests were at a constant engine speed set at 2,000 rpm. In FIG. 8, G denotes an equivalence ratio, that is, the ratio of the theoretical air-fuel ratio to the air-fuel ratio of the supplied mixture gas. The ratio G of 0.8 corresponds to high engine load and the ratio G of 0.4 corresponds to low engine load. As is apparent from FIG. 8, the temperature of the combustion chamber wall at high engine load (G=0.8) is maintained below a specific temperature, for example 180° C., when the flow rate of the oil jet is kept above 40 g/sec by the computer means 17 and valve means 14. As a result, the maximum combustion pressure Pmax is held below a specific pressure, for example 58 kg/cm$^2$.

Figure 9:
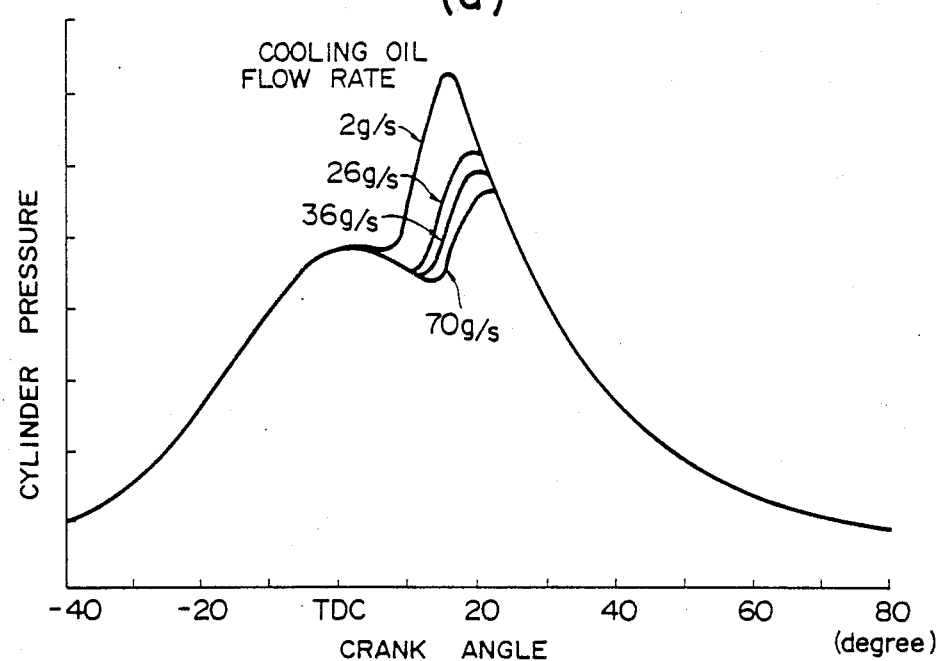
FIG. 9a is a diagram showing a relationship between crank angle and cylinder pressure with varied cooling oil jet flow rates in a high engine load range.
FIG. 9b is a diagram showing a relationship between frequency of engine noise and cylinder pressure level with varied cooling oil jet flow rates in the high engine load range.
Figure 9:
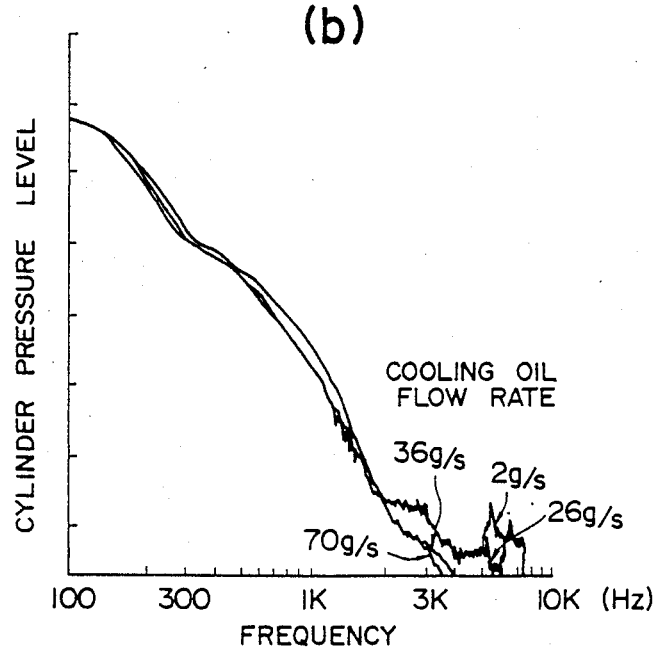

The suppression of the maximum cylinder pressure reduces combustion noises as shown in FIG. 9b, which will be explained in more detail hereinafter, and can permit the engine weight to be reduced because the walls of the engine can be made thin. Also, as is apparent from FIG. 8, the temperature of the combustion chamber wall at low engine load (G=0.4) is maintained above a specific temperature, for example 180° C., by adjusting the flow rate of the oil jet below 20 g/sec by the valve means 14. As a result, the cycle-by-cycle variation in rate of combustion is maintained below 3%. The suppression of the cycle-by-cycle variation in rate of combustion reduces delayed combustion, and the combustion period can be maintained short so that the fuel efficiency can be held good.

The other characteristics such as HC and NO$_x$ volume, and smoke in the exhaust gas are not likely to vary widely in response to the change of the oil jet flow rate at low engine load, and therefore the reduction of oil jet flow rate at low engine load range does not sacrifice the characteristics of HC, aldehydes and smoke volumes in the exhaust gas. The optimum oil flow area of the oil path 12 calculated by the computer means 17 maintains the oil jet flow volume above, for example, 40 g/sec in the high engine load range and the oil flow area of the oil path 12 adjusted by the valve means 14 maintains the oil jet volume below, for example, 20 g/sec.

FIG. 9a and FIG. 9b respectively show the cylinder pressure characteristics and the cylinder pressure level characteristics in the high engine load range (G=0.8) corresponding to the Pmax characteristics in the case of high engine load in FIG. 8. The pressure level characteristics in FIG. 9b are obtained through frequency analysis of the cylinder pressures shown in FIG. 9a. The frequency region over 1 KHz in FIG. 9b is the noise region which is preferable to be reduced. In the tests, the engine speeds were set at 2,000 rpm. Also, the fuel was injected at 26 degrees of crank angle position from top dead center and spark-ignition was performed at top dead center. As is apparent from FIGS. 9a and 9b, the characteristics of the cylinder pressure and combustion noise vary, depending on the oil jet flow rates, and by adopting the optimum oil jet flow rate, that is, by controlling the oil jet flow rate to be over 40 g/sec, the combustion pressure and combustion noise can be reduced to small levels.

Figure 10:
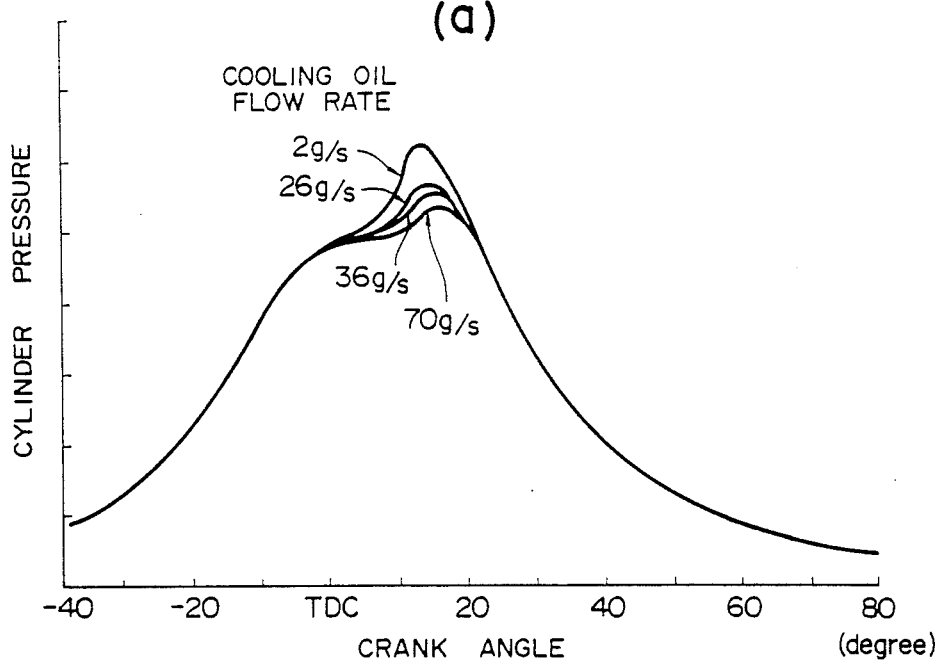
FIG. 10a is a diagram showing a relationship between crank angle and cylinder pressure with varied cooling oil jet flow rates in a low engine load range.
FIG. 10b is a diagram showing a relationship between frequency of engine noise and cylinder pressure level with varied cooling oil jet flow rates in the low engine load range.
Figure 10:
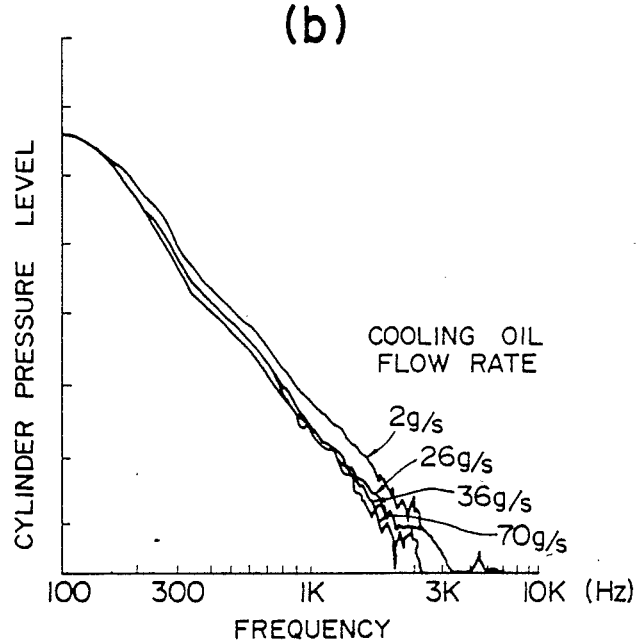

FIG. 10a and FIG. 10b show the cylinder pressure characteristics and the cylinder pressure level characteristics corresponding to the combustion level in the tests where the engine loads was low in FIG. 8, that is, where G=0.4. In these tests, the fuel was injected at 26 degrees of crank angle position from top dead center and spark-ignition was performed at 6 degrees from top dead center. As is apparent from FIGS. 10a and 10b, at low engine load, small enough combustion pressure and combustion noise can be attained even with small oil jet flow rates.

In the fourth embodiment of the present invention, the temperature of the combustion chamber wall 4a is controlled in nearly the same manner as in the first to the third embodiments. In the low engine load range, due to the heat insulating structure of the wall 4a, the temperature of the combustion chamber wall 4a is maintained above a certain level. In the high engine load range, the flow rate of the cooling oil jet is adjusted corresponding to the engine speeds and engine loads by moving and rotating the plunger 54, and the the temperature of the combustion chamber wall 4a is maintained optimum. Thus, the maximum combustion pressure Pmax in the high engine load range is kept below a predetermined level so that the combustion noises are kept low and the engine weight can be reduced. Also, the cycle-by-cycle variation in rate of combustion in the low engine load range is kept low so that the combustion period can be maintained short and the fuel efficiency can be kept high.

Although only several preferred embodiments of the present invention have been described in detail, it will be appreciated by those skilled in the art that various modifications and alterations can be made to the particular embodiments shown without materially departing from the novel teachings and advantages of the invention. Accordingly, it is to be understood that all such modifications and alterations are included within the scope of the invention as defined by the following claims.

What I claim is:

1. A fuel evaporation rate control system for a direct fuel injection type spark ignition internal combustion engine including a cylinder, a piston reciprocally movable in the cylinder, a concave wall portion located in the top of the piston to define a combustion chamber, the wall portion having a front surface facing the inside of the piston, means for directly injecting fuel into said combustion chamber onto the front surface of the combustion chamber wall such that the fuel adhering onto the combustion chamber wall is evaporated by heat from the wall to generate a combustible mixture gas, said system comprising:

an oil path for supplying oil to the engine;

a nozzle means connected to said oil path for spraying a cooling oil jet onto the back surface of said combustion chamber wall so as to control the combustion chamber wall temperature for limiting the evaporation rate of the fuel adhering onto the front surface of said combustion chamber wall, said wall having a heat insulating structure, said nozzle means being located below the piston;

a valve means located in said oil path for adjusting an oil flow area of said oil path upstream of said nozzle means;

a computer means for calculating an optimum oil flow area of said oil path to obtain an optimum combustion chamber wall temperature in accordance with at least one engine operating parameter based on a map stored in a memory of the computer and for sending its output to said valve means so as to control said valve means to adjust the oil flow area of said oil path to said calculated optimum oil flow area; and a sensor means for sensing said engine operating parameter and for sending a signal of said engine operating parameter to said computer means as an input.

2. The fuel evaporation rate control system of claim 1, wherein said engine operating parameter is at least one of engine speed and engine load.

3. The fuel evaporation rate control system of claim 1, wherein said map specifies a relationship between engine loads and optimum oil flow areas of said oil path at various engine speeds.

4. The fuel evaporation rate control system of claim 1, wherein said system further comprises an engine cooling water temperature sensor and an engine oil temperature sensor for determining the warmed-up state of the engine.

5. The fuel evaporation rate control system of claim 4, further comprising means to set said computer means to on when said cooling water temperature and oil temperature sensors indicate that the engine cooling water temperature and the engine oil temperature are high and to set said computer means to off when said cooling water temperature and oil temperature sensors indicate that the engine cooling water temperature and the engine oil temperature are low and means to set said oil flow area of said oil path at nearly zero by said valve means.

6. The fuel evaporation rate control system of claim 1, wherein said heat insulating structure comprises means for connecting the combustion chamber wall to the piston body at a periphery of the wall, said periphery having a small area of heat transfer as compared with an area of the back surface of the wall onto which said cooling oil jet is sprayed.

7. The fuel evaporation rate control system of claim 1, wherein said heat insulating structure comprises means for connecting said combustion chamber wall to the piston body, said connecting means being constructed of a heat insulating material.

8. The fuel evaporation rate control system of claim 1, wherein said combustion chamber wall is constructed of a heat insulating material.

9. The fuel evaporation rate control system of claim 1, wherein said valve means is a solenoid valve which varies the oil flow area of said oil path.

10. A fuel evaporation rate control system for a direct fuel injection type spark-ignition internal combustion engine including a cylinder, a piston reciprocally movable in the cylinder, a concave wall portion located in the top of the piston to define a combustion chamber, the wall portion having a front surface facing the combustion chamber and a back surface facing the inside of the piston, means for directly injecting fuel into said combustion chamber onto the front surface of the combustion chamber wall such that the fuel adhering onto the combustion chamber wall is evaporated by heat from the wall to generate a combustible mixture gas, and means for generating a spark to ignite said combustible mixture gas, said system comprising:

an oil path for supplying oil to the engine;

a nozzle means connected to said oil path for spraying a cooling oil jet into the back surface of said combustion chamber wall, said nozzle means being located below the piston;

a plunger slidably and rotatably positioned in said oil path, said plunger being balanced by the force of the oil pushing against an upstream end of the plunger and a spring force urging the plunger upstream, said plunger being displaced downstream corresponding to the oil pressure, which increases with engine speeds;

a bypass connecting a first opening in the oil path upstream of said plunger and a second opening in the oil path near the middle portion of said plunger;

an oil groove formed on the surface of said plunger connecting the second opening of said bypass to a downstream of said plunger; and a connecting means for connecting said plunger to an accelerator so as to rotate said plunger corresponding to a movement of the accelerator.

11. The fuel evaporation rate control system of claim 10, wherein said combustion chamber wall is connected to a piston body at a periphery of the wall, said periphery having a small area of heat transfer as compared with the area of the back surface of said wall onto which said cooling oil jet is sprayed.

12. The fuel evaporation rate control system of claim 10, wherein a junction of said combustion chamber wall to a piston body is constructed of a heat insulating material.

13. The fuel evaporation rate control system of claim 10, wherein said combustion chamber wall is constructed of a heat insulating material.

* * * * *

UNITED STATES PATENT AND TRADEMARK OFFICE
CERTIFICATE OF CORRECTION

PATENT NO. : 4,667,630
DATED : 26 May 1987
INVENTOR(S) : Shizuo SASAKI

It is certified that error appears in the above-identified patent and that said Letters Patent is hereby corrected as shown below:

| Column | Line | |
|---|---|---|
| 1 | 56: | after "weight" insert --because of--; after "the" insert --reduced--. |
| 7 | 63: | after "loads" change "was" to --were--. |
| 8 | 39: | after "facing" insert --the combustion chamber and a back surface facing--. |
| 10 | 28: | change "to a" to --to the oil path--. |

Signed and Sealed this

Seventeenth Day of November, 1987

Attest:

DONALD J. QUIGG

Attesting Officer          Commissioner of Patents and Trademarks